US008317452B2

(12) United States Patent
Lundin

(10) Patent No.: US 8,317,452 B2
(45) Date of Patent: Nov. 27, 2012

(54) CONVERTER DOLLY FOR A TANDEM TRAILER

(75) Inventor: Richard E. Lundin, Park Ridge, IL (US)

(73) Assignee: Lundin Recovery Equipment LLC, Park Ridge, IL (US)

( * ) Notice: Subject to any disclaimer, the term of this patent is extended or adjusted under 35 U.S.C. 154(b) by 281 days.

(21) Appl. No.: 12/425,671

(22) Filed: Apr. 17, 2009

(65) Prior Publication Data

US 2009/0250901 A1    Oct. 8, 2009

Related U.S. Application Data

(63) Continuation-in-part of application No. 11/958,950, filed on Dec. 18, 2007, now Pat. No. 8,132,999.

(51) Int. Cl.
*B60P 1/04* (2006.01)
(52) U.S. Cl. .......................... 414/482; 280/442; 280/434
(58) Field of Classification Search .................. 414/495, 414/482, 471; 280/442, 434, 438.1, 493, 280/81.6
See application file for complete search history.

(56) References Cited

U.S. PATENT DOCUMENTS

| | | | |
|---|---|---|---|
| 2,571,234 A | 10/1951 | Guest | |
| 3,575,444 A | 4/1971 | Veenema et al. | |
| 3,697,098 A * | 10/1972 | Fisher | 280/415.1 |
| 3,880,439 A * | 4/1975 | Wolter | 280/81.6 |
| 3,884,494 A | 5/1975 | Ashby et al. | |
| 4,202,276 A * | 5/1980 | Browne et al. | 105/165 |
| 4,252,336 A | 2/1981 | Hubbard | |
| 4,320,607 A | 3/1982 | Eubank | |
| 4,461,455 A * | 7/1984 | Mills et al. | 254/3 R |
| 4,524,841 A | 6/1985 | Waggoner | |
| 4,555,214 A | 11/1985 | Morton | |
| 4,599,968 A | 7/1986 | Ryder et al. | |
| 4,708,358 A | 11/1987 | Gehman et al. | |
| 4,759,563 A * | 7/1988 | Nash | 280/476.1 |

(Continued)

FOREIGN PATENT DOCUMENTS

GB    1563796    4/1980

OTHER PUBLICATIONS

U.S. Appl. No. 12/166,710, filed Jul. 20, 2008, Richard Lundin.

(Continued)

*Primary Examiner* — Saul Rodriguez
*Assistant Examiner* — Glenn Myers
(74) *Attorney, Agent, or Firm* — John S. Paniaguas; Katten Muchin Rosenman LLP

(57) ABSTRACT

A converter dolly is disclosed for use with a tandem trailer arrangement. In accordance with an important aspect of the invention, the converter dolly is multi-functional and is user configurable. In particular, the converter dolly in accordance with the present invention includes an adjustable saddle can be adjusted to fit any conventional trailer. The saddle is carried by a wheeled cart, which includes a fifth wheel assembly for coupling to a tandem trailer. The saddle is configured to seat a tandem trailer. The height of the saddle relative to the underside of the tandem trailer is user configurable. In an extended position, the tandem trailer is seated in the saddle which prevents rotation of the tandem trailer with respect to the converter dolly thus eliminating one of the three pivot points in a conventional tandem trailer arrangement. In order to provide steering for the tandem trailer, the wheels on the wheeled cart are carried by self steering axles.

10 Claims, 10 Drawing Sheets

U.S. PATENT DOCUMENTS

| | | | |
|---|---|---|---|
| 4,768,802 A * | 9/1988 | Winkler | 280/408 |
| 4,856,804 A * | 8/1989 | Nash | 280/430 |
| 4,861,221 A | 8/1989 | Krisa | |
| 5,004,075 A * | 4/1991 | Ascenzo | 187/210 |
| 5,013,209 A | 5/1991 | DeMichele et al. | |
| 5,098,115 A * | 3/1992 | Haire et al. | 280/476.1 |
| 5,370,414 A | 12/1994 | Tucker | |
| 5,477,937 A * | 12/1995 | Chagnon | 180/24.01 |
| 5,628,607 A | 5/1997 | Kyzer et al. | |
| 5,655,733 A | 8/1997 | Roach | |
| 5,660,518 A | 8/1997 | Meier | |
| 5,722,677 A | 3/1998 | Lichter et al. | |
| 5,727,920 A * | 3/1998 | Hull et al. | 414/476 |
| 5,785,341 A | 7/1998 | Fenton | |
| 5,839,876 A | 11/1998 | McCarthy et al. | |
| 5,845,920 A | 12/1998 | Hill | |
| 5,863,059 A | 1/1999 | Waggoner | |
| 6,036,217 A * | 3/2000 | Burkhart et al. | 280/476.1 |
| 6,120,051 A | 9/2000 | Lichter et al. | |
| 6,170,849 B1 | 1/2001 | McCall | |
| 6,290,248 B1 | 9/2001 | Yrigoyen | |
| 6,298,536 B1 * | 10/2001 | Rossway et al. | 29/281.1 |
| 6,361,023 B1 * | 3/2002 | Peavler | 254/424 |
| 6,364,324 B1 | 4/2002 | Buchanan | |
| 6,450,523 B1 | 9/2002 | Masters et al. | |
| 6,491,490 B1 | 12/2002 | Trobee | |
| 6,623,028 B1 | 9/2003 | Johnston | |
| 6,663,131 B2 | 12/2003 | Evans | |
| 6,681,535 B1 | 1/2004 | Batchelor | |
| 6,796,566 B2 * | 9/2004 | VanDenberg | 280/86.5 |
| 6,820,887 B1 | 11/2004 | Riggle | |
| 6,843,487 B1 | 1/2005 | Lotman | |
| 6,871,862 B2 * | 3/2005 | Chalin | 280/86.5 |
| 6,929,249 B1 | 8/2005 | Kim | |
| 7,017,934 B2 | 3/2006 | Harris | |
| 7,100,933 B2 | 9/2006 | Zackovich et al. | |
| 7,108,274 B2 * | 9/2006 | Laarman | 280/438.1 |
| 7,275,345 B2 | 10/2007 | Cosse, III et al. | |
| 7,275,753 B1 | 10/2007 | Ceccarelli et al. | |
| 7,281,728 B1 * | 10/2007 | Wayrynen | 280/414.1 |
| 7,416,378 B1 * | 8/2008 | Adams | 414/679 |
| 7,571,916 B2 | 8/2009 | Skiles | |
| 7,726,247 B2 | 6/2010 | Neland | |
| 2003/0132604 A1 | 7/2003 | Evans | |
| 2004/0021290 A1 * | 2/2004 | Hicks et al. | 280/438.1 |
| 2004/0197176 A1 * | 10/2004 | Pate | 414/495 |
| 2005/0002767 A1 | 1/2005 | Oosterhouse | |
| 2005/0161903 A1 | 7/2005 | Harris | |
| 2007/0035103 A1 | 2/2007 | Anton | |
| 2009/0155035 A1 | 6/2009 | Lundin | |
| 2009/0250901 A1 | 10/2009 | Lundin | |
| 2011/0135438 A1 | 6/2011 | Lundin | |

OTHER PUBLICATIONS

U.S. Appl. No. 11/958,950, filed Dec. 18, 2007, Richard Lundin.

http://www.citationce.com/airlift.htm.

* cited by examiner

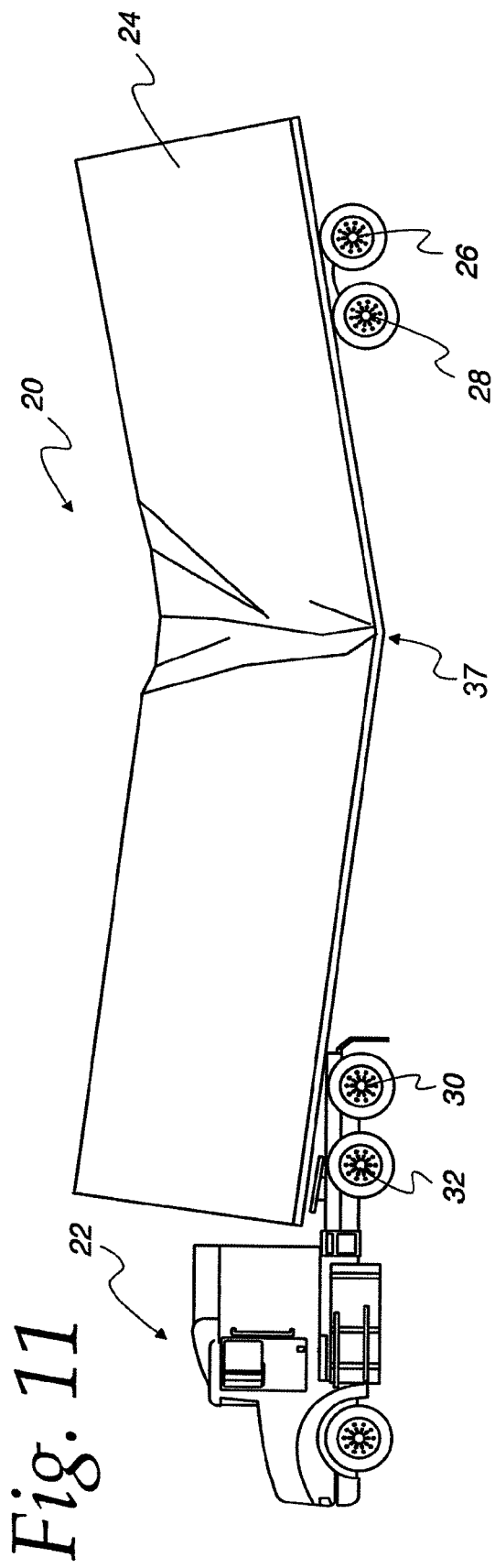
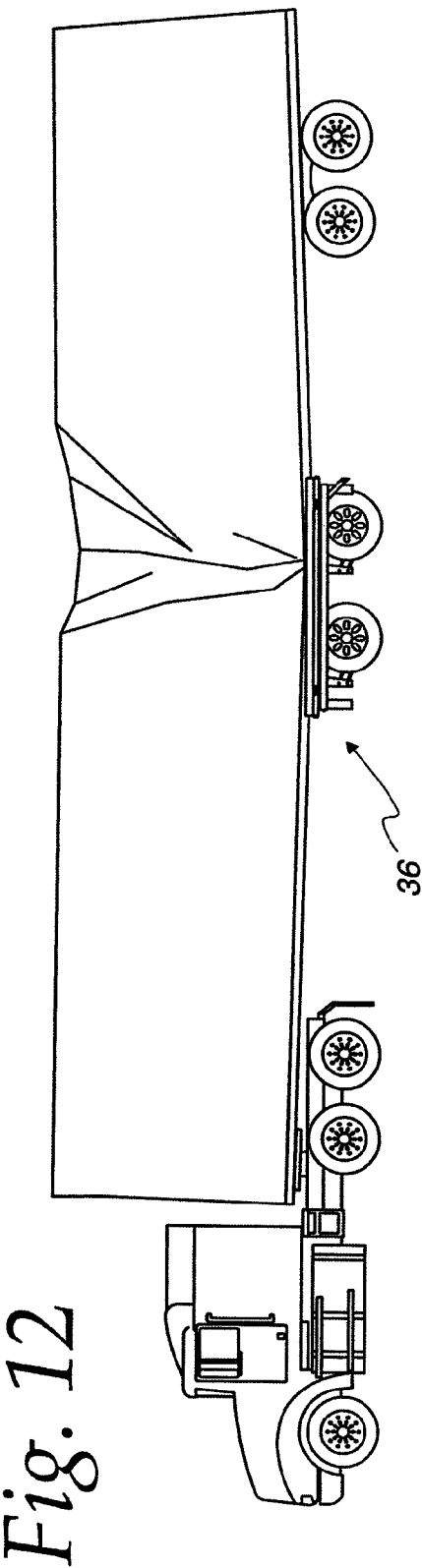

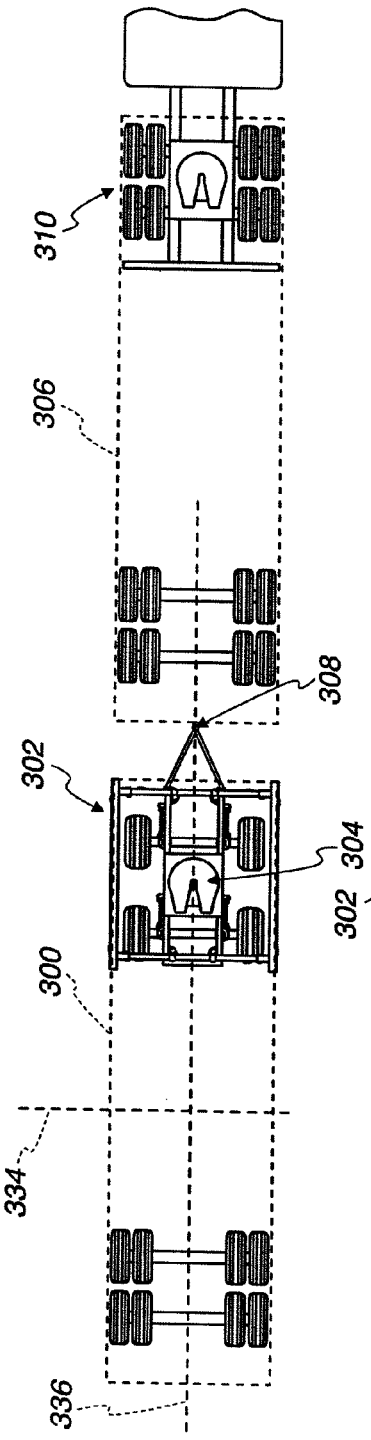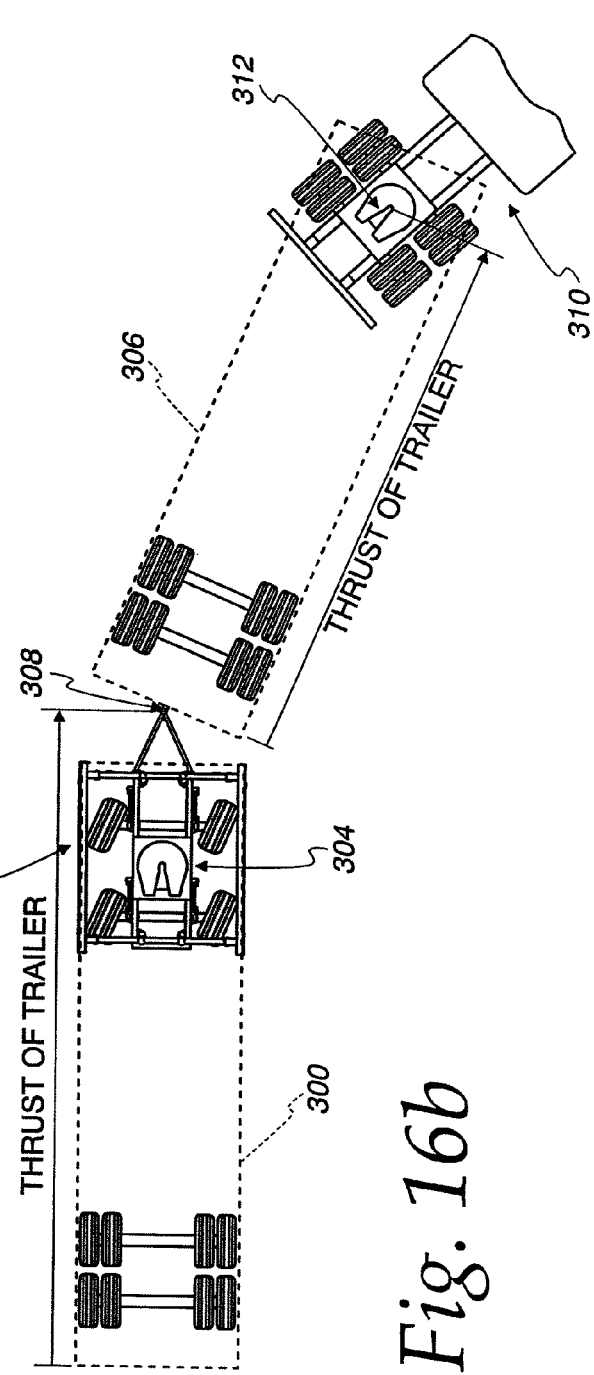
Fig. 16a
Fig. 16b

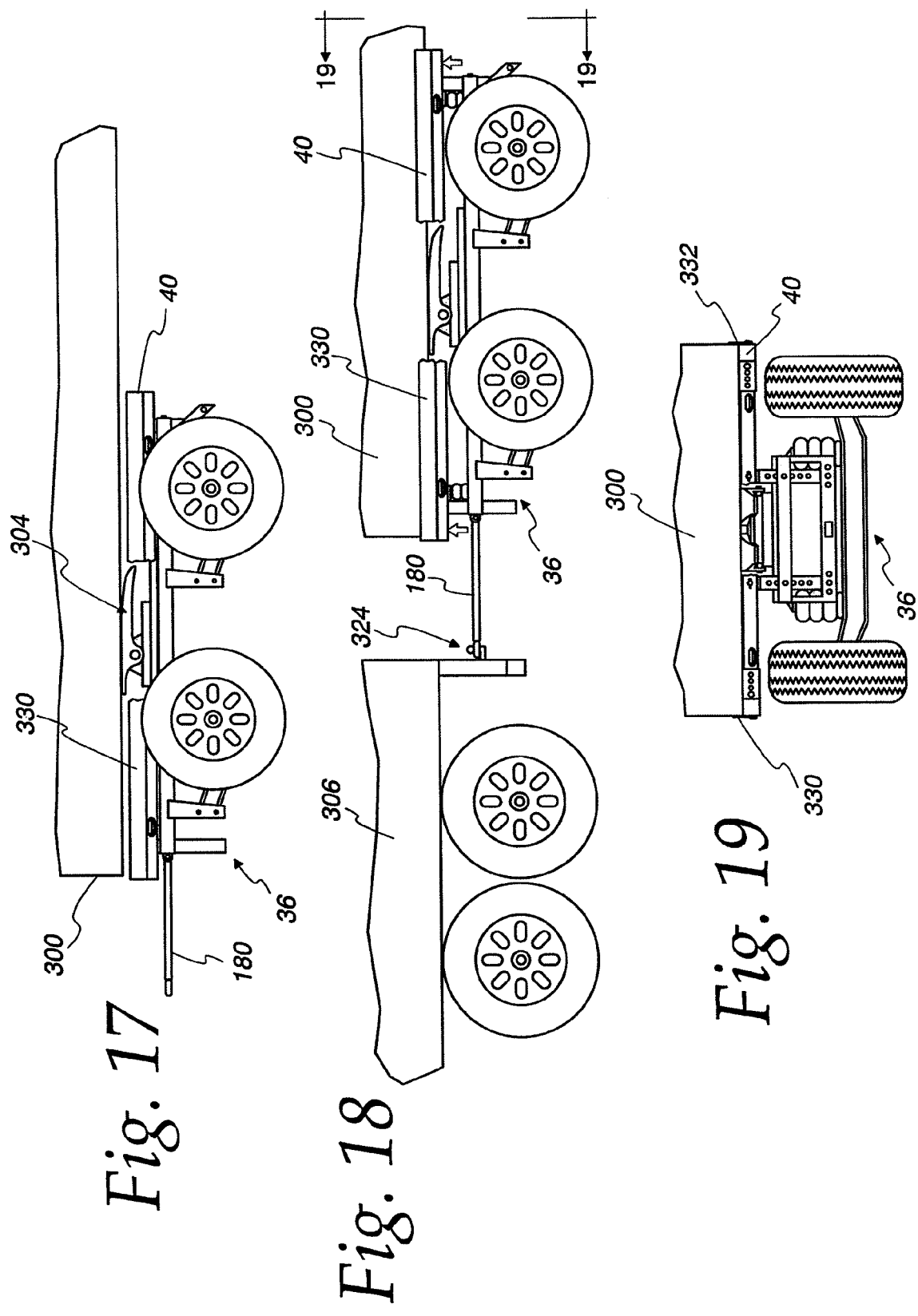

CONVERTER DOLLY FOR A TANDEM TRAILER

CROSS-REFERENCE TO RELATED APPLICATIONS

The present application is a continuation-in-part of commonly owned U.S. patent application Ser. No. 11/958,950, filed on Dec. 18, 2007 now U.S. Pat. No. 8,132,999, hereby incorporated by reference.

BACKGROUND OF THE INVENTION

1. Field of the Invention

The present invention relates to a converter dolly for use with a tandem semi-trailer configured with a fifth wheel and an adjustable saddle which allows the maneuverability of the tandem trailers to be adjusted according to the driving conditions.

2. Description of the Prior Art

Tandem trailers are becoming ever more popular for transporting goods by truck. Various known methods are known for coupling a tandem trailer to a lead trailer. Examples of such coupling systems are disclosed in U.S. Pat. Nos. 4,230,335; 4,600,210; 5,338,050 and 5,407,221, all hereby incorporated by reference.

U.S. Pat. Nos. 5,098,115; 5,338,050 and 5,407,221, disclose so called "converter dollies" for coupling a tandem trailer to a lead trailer. As shown in FIG. 13, such converter dollies 200 normally include a wheeled frame 202 formed with a tongue portion 204 extending forward from the wheeled frame 202. A hitch 206 is disposed at an extending end of the tongue portion 204. Various conventional hitches are known to be used which allow the lead trailer to pivot relative to the converter dolly 200. The wheeled frame 202 includes a fixed axle 207 for rotatably carrying a pair of wheels 208, 210. In as much as the wheels 208, 210 are coupled to a fixed axle 206, the wheels 208,210 are not steerable. A base plate 212 is carried by the wheeled frame 202 adjacent the axle 206. A fifth wheel assembly 214 is carried by the base plate 212. The fifth wheel assembly 214 allows the tandem trailer to pivot relative to the converter dolly 200. In particular, the tandem trailer pivots about a king pin (not shown) which forms part of the fifth wheel assembly. By allowing the converter dolly 200 to pivot, the converter dolly 200 is able steer the tandem trailer with its fixed wheels in the direction of the lead trailer.

The lead trailers are known to be connected to a semi tractor by a way of a fifth wheel assembly which includes a king pin. As such, during forward driving conditions, the tandem trailer arrangement define three (3) pivot points:

Semi tractor with respect to the lead trailer
Lead trailer with respect to the converter dolly
Tandem trailer with respect to the converter dolly.

Under forward driving conditions, the three (3) pivot points allow the tandem arrangement to make relatively tight turns. However, the three (3) pivot points make it virtually impossible even for the most experienced drivers to back up such tandem trailer arrangements. As such, it is known to disconnect the tandem trailer so that the lead trailer can be backed up to a loading/unloading dock. Once the lead trailer is loaded/unloaded, the lead trailer is pulled away and the semi tractor is reconnected to the tandem trailer. The tandem trailer is then backed up to the loading/unloading dock. The semi tractor is then disconnected from the tandem trailer and reconnected to the lead trailer. The lead trailer is then backed up to the tandem trailer and reconnected thereto. As such loading and unloading of such tandem trailer arrangements is relatively cumbersome.

In order to solve this problem, user configurable converter dollies have been developed which enable the pivot point between the tandem trailer and the converter dolly to be eliminated to facilitate baking up of such tandem trailers thus avoiding the need to disconnect the tandem trailer before backing up. In a normal forward driving mode, the user configurable converter dolly provides for the three (3) pivot points as discussed above. In a back up mode of operation, the pivot point between the tandem trailer and the converter dolly is eliminated. An example of such a user configurable converter dolly is disclosed in U.S. Pat. Nos. 5,098,115 and 5,407,221, hereby incorporated by reference.

In particular, the user configurable converter dolly disclosed in these patents includes vertically oriented retractable pins that are carried by the converter dolly. These retractable pins are configured to be received in apertures in a bearing plate rigidly attached to the tandem trailer. In a retracted position, the tandem trailer freely pivots with respect to the converter dolly. In an extended position, the pins are received in the apertures in the bearing plate on the underside of the bearing trailer. Ehen the pins are within the apertures, no pivotal movement is possible between the converter dolly and the tandem trailer, thus eliminating a pivot point to enable the tandem trailer arrangement to be backed up without disconnecting the trailers.

There are several problems associated with the configuration disclosed in the '115 and '221 patents. First, such a configuration can only be used on tandem trailers which include a bearing plate on the underside with apertures. Such a feature is not standard on conventional tandem trailers. As such, the user configurable converter dolly only has limited utility. Secondly, in order to prevent pivoting of the tandem trailer relative to the converter dolly, the retractable pins must be vertically aligned with the apertures in the bearing plate. Relatively tight tolerances would have to be maintained with respect to the horizontal spacing between the retractable pins on the converter dolly and the location of the bearing plate and apertures on the underside of the tandem trailer. Aligning the retractable pins with apertures on the underside of the tandem trailer by way of positioning the tandem trailer with the semi tractor also requires that the tandem trailer and the converter dolly to be relatively precisely aligned. Moreover, such tandem trailer arrangements will likely be exposed to relatively harsh environmental conditions. As such, the retractable pins may not function properly over time.

U.S. Pat. No. 6,036,217 discloses a converter dolly for use with a tandem trailer. The converter dolly disclosed in the '217 patent includes a wheeled cart with self-steering axles. In order to eliminate the need to disconnect the tandem trailer, the converter dolly includes a locking mechanism that is configured to cooperate with stops mounted on the underside of the tandem trailer to prevent rotation of the converter dolly with respect to the tandem trailer. Unfortunately, the use of the converter dolly disclosed in the '217 patent requires a custom tandem trailer and thus has relatively limited utility, similar to the converter dollies disclosed in the '115 and '221 patents . . . .

Unfortunately, such conventional converter dollies are subject to problems during certain forward driving conditions. Such forward driving conditions are illustrated in FIGS. 15*a* and 15*b*. In particular, FIGS. 15*a* and 15*b* illustrate tandem trailer arrangements utilizing a conventional converter dolly, such as, the converter dollies disclosed in the '115 and '221 patents, discussed above. For simplicity, only a portion of the semi tractor is shown and identified with the reference numeral 220. As shown, the semi tractor is coupled to a lead trailer 222, which, in turn, is coupled to a tandem trailer 224. In particular, the semi tractor is coupled to the lead trailer 222 by way of a fifth wheel assembly 226, that is rigidly attached to the semi tractor 220 and a king pin (not shown) that is rigidly extending downward from the underside of the lead trailer 222. The lead trailer 222 is coupled to the tandem trailer 224 by way of a converter dolly 228. The converter dolly 228 is coupled to the tandem trailer 224 by way of a fifth wheel assembly 230 and a king pin (not shown) that rigidly extends downward from the underside of the tandem trailer 224. As discussed above, the converter dolly 228 includes a hitch 232 that enables the converter dolly 228 to be pivotally connected to rear of the lead trailer 222.

As mentioned above and as best shown in FIG. 15*b*, a tandem trailer arrangement with a conventional converter dolly defines three (3) pivot points during forward driving conditions. These three (3) pivot points are as follows:

Semi tractor with respect to the lead trailer, identified in FIG. 15*b* as "A";

Lead trailer with respect to the converter dolly, identified in FIG. 15*b* as "B";

Tandem trailer with respect to the converter dolly, identified in FIG. 15*b* as "C" . . . .

Unfortunately, such a conventional converter dolly 228 can cause problems in during forward driving conditions. In particular, such conventional converter dollies can cause the lead trailer 222 and the tandem trailer 224 to whipsaw as shown in FIG. 15*b* in response to certain external conditions, such as high winds or panic stops during forward driving conditions. As shown in FIG. 15*b*, as a result of such external conditions, the converter dolly 228 is likely to rotate with respect to the tandem trailer 224. As a consequence, the thrust or momentum of the tandem trailer 224 is translated to the converter dolly 228 in the direction shown. The thrust of the converter dolly 228 pushes the lead trailer 222 in a different direction, as shown, resulting in a relatively dangerous situation.

Thus, there is a need to provide a converter dolly that solves the problems associated with conventional converter dollies and is able to mitigate the effects of external conditions, such as high winds and panic stops, during forward driving conditions. There is also a need for a converter dolly that eliminates the need to disconnect the tandem trailer in order to back up.

SUMMARY OF THE INVENTION

Briefly, the present invention relates to a converter dolly for use with a tandem trailer arrangement. In accordance with an important aspect of the invention, the converter dolly is multifunctional and is user configurable. In particular, the converter dolly in accordance with the present invention includes an adjustable saddle can be adjusted to fit any conventional trailer. The saddle is carried by a wheeled cart, which includes a fifth wheel assembly for coupling to a tandem trailer. The saddle is configured to seat a tandem trailer. The height of the saddle relative to the underside of the tandem trailer is user configurable. In an extended position, the tandem trailer is seated in the saddle which prevents rotation of the tandem trailer with respect to the converter dolly thus eliminating one of the three pivot points in a conventional tandem trailer arrangement. In order to provide steering for the tandem trailer, the wheels on the wheeled cart are carried by self steering axles. Such a configuration eliminates potentially dangerous situations during forward driving in response to external conditions, such as high winds and panic stops. When the saddle is retracted, the self steering axles are locked in place to enable the converter dolly to be used in a conventional manner. The converter dolly in accordance with the present invention thus eliminates one of the pivot points in a tandem trailer arrangement during normal forward driving and by doing so eliminates potentially dangerous conditions resulting from external conditions, such as high winds and sudden stops. In a mode in which the saddle is retracted, the self steering axles are locked in place to enable the converter dolly to operate in a conventional manner which enables better forward maneuvering in urban areas.

DESCRIPTION OF THE DRAWINGS

These and other advantages of the present invention will be readily understood with reference to the following specification and attached drawing wherein:

FIG. 11 is a side elevational view of a conventional tractor trailer illustrating damage to the trailer between the rear axle and the front of the trailer.

FIG. 12 is similar to FIG. 11 but illustrating the use of the dolly as a support for the damaged portion of the trailer.

FIG. 16*a* is a bottom view of a tandem trailer arrangement illustrating a semi tractor partially broken away coupled to a lead trailer, which in turn, is coupled to a tandem trailer using a converter dolly in accordance with the present invention during normal forward driving conditions.

FIG. 16*b* is similar to FIG. 16*a* but illustrating the response of the tandem trailer arrangement in response to an external condition, such as a high wind or sudden stop.

FIG. 17 is a side elevational view of the converter dolly in accordance with the present invention shown with a tandem trailer partially broken away and illustrated with the saddle in a retracted position which enables the dolly to be used in a conventional manner during low speed maneuvering in urban areas.

FIG. 18 is a side elevational view of the converter dolly in accordance with the present invention shown with a tandem trailer partially broken away and shown coupled to a lead trailer and illustrated with the saddle in an extended position for normal forward driving.

FIG. 19 is a rear elevational view of the converter dolly illustrated in FIG. 18 along line 19-19.

DETAILED DESCRIPTION

Figure 13:
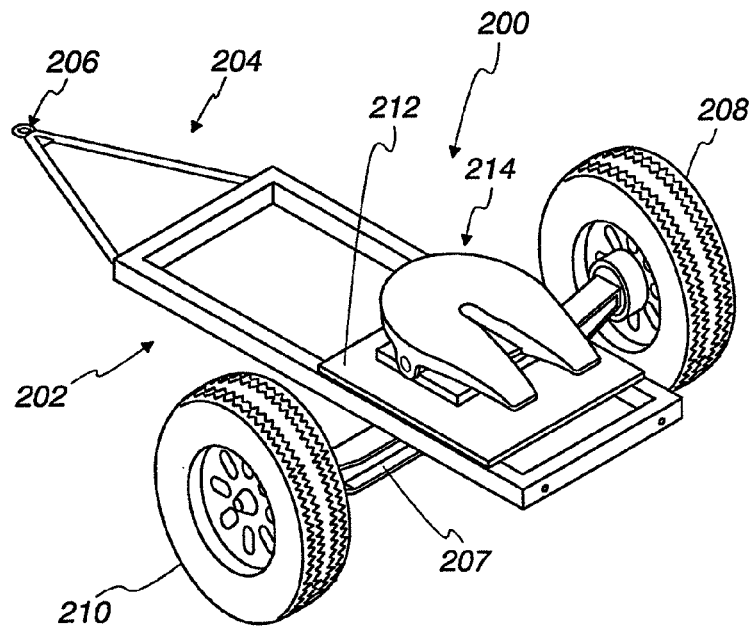
FIG. 13 is an isometric view of a conventional converter dolly.

The present invention relates a converter dolly for use with a tandem trailer arrangement. The converter dolly in accordance with the present invention is illustrated in FIGS. 14, 16a, 16b and 17-19. Conventional converter dollies are illustrated in FIGS. 13, 15a and 15b. The converter dolly in accordance with the present invention incorporates a wheeled cart, as illustrated in FIGS. 1-10.

Converter Dolly

In accordance with an important aspect of the invention, the converter dolly in accordance with the present invention is multi-functional and is user configurable. In particular, the converter dolly in accordance with the present invention includes an adjustable saddle can be adjusted to fit any conventional trailer. The saddle is carried by a wheeled cart, which includes a fifth wheel assembly for coupling to a tandem trailer. The saddle is configured to seat a tandem trailer. The height of the saddle relative to the underside of the tandem trailer is user configurable. In an extended position, the tandem trailer is seated in the saddle which prevents rotation of the tandem trailer with respect to the converter dolly thus eliminating one of the three pivot points in a conventional tandem trailer arrangement. In order to provide steering for the tandem trailer, the wheels on the wheeled cart are carried by self steering axles. Such a configuration eliminates potentially dangerous situations during forward driving in response to external conditions, such as high winds and panic stops. When the saddle is retracted, the self steering axles are locked in place to enable the converter dolly to be used in a conventional manner. The converter dolly in accordance with the present invention thus eliminates one of the pivot points in a tandem trailer arrangement during normal forward driving and by doing so eliminates potentially dangerous conditions resulting from external conditions, such as high winds and sudden stops. In a mode in which the saddle is retracted, the self steering axles are locked in place to enable the converter dolly to operate in a conventional manner which enables better forward maneuvering in urban areas.

Referring first to FIGS. 16a and 16b, FIG. 16a illustrates a bottom view of a tandem trailer arrangement which incorporates a converter dolly in accordance with the present invention. In particular, a tandem trailer 300 is coupled to a converter dolly 302 in accordance with the present invention by way of a fifth wheel assembly 304 and a king pin (not shown) extending downwardly from the underside of the tandem trailer 300. As will be discussed in more detail below, the converter dolly 302 is also coupled to the rear of a lead trailer 306 by way of a conventional hitch assembly 308. The lead trailer 306, in turn, is coupled to a semi tractor 310 by way of a fifth wheel assembly 312 and a king pin (not shown) extending downwardly from the underside of the lead trailer 306. Unlike conventional converter dollies, the converter dolly 302 is configurable so that it does not rotate relative to the tandem trailer 300 during normal forward driving conditions, such as highway driving conditions. As such, one of three (3) pivot points associated with tandem trailer arrangements is eliminated during normal forward driving conditions.

Another important difference between the converter dolly 302 and conventional converter dollies relates to the self steering axles. More particularly, various known converter dollies, such as disclosed in U.S. Pat. Nos. 5,098,115 and 5,407,221, described above, include fixed axles and thus rely on the rotation of the converter dolly for steering. As mentioned above, U.S. Pat. No. 6,036,217 discloses a converter dolly with self-steering axles. The '217 patent discloses a locking mechanism for preventing rotation of the converter dolly with respect to the tandem trailer that is only useful with custom tandem trailers. As will be discussed in more detail below, the converter dolly 302 utilizes a saddle which can be lifted to capture the peripheral frame of the tandem trailer to prevent rotation of the converter dolly 302 with respect to the tandem trailer 300. In this mode the axles are allowed to be self steering. When the saddle is uncoupled from the tandem trailer 300, the self steering axles are locked and the converter dolly 302 operates in a conventional manner to enable better maneuvering in urban areas, for example.

FIG. 16b illustrates the response of the tandem trailer arrangement in response to an external condition, such as a high wind or sudden stop. During normal forward driving conditions, the tandem trailer 300 is prevented from rotating relative to the converter dolly 302. As shown, the self steering axles steer the tandem trailer 300 in the same direction as the lead trailer 306 thus preventing a virtual jack knife of the converter dolly 302 with respect to the lead trailer 306, unlike the situation illustrated in FIG. 15b.

In accordance with a further aspect of the invention, backing up of the tandem trailer arrangement illustrated in FIG. 16a is facilitated when rotation between the converter dolly 302 and the tandem trailer 300 is prevented without uncoupling the tandem trailer 300. During this mode, self steering axles can be locked or be used in a self steering mode. Self steering axles which can be locked out are generally known in the art. An example of a lockable self steering axle is disclosed in U.S. Pat. No. 5,620,194, hereby incorporated by reference.

Figure 14:
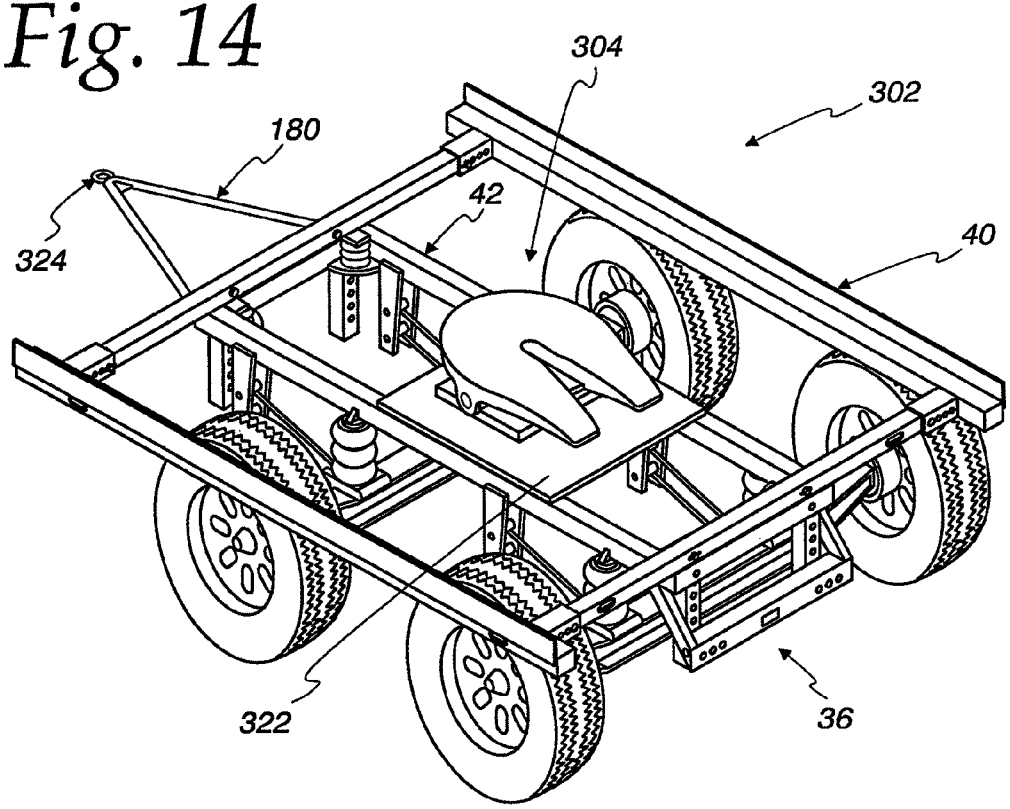
FIG. 14 is an isometric view of a converter dolly in accordance with the present invention.
Figure 15A:
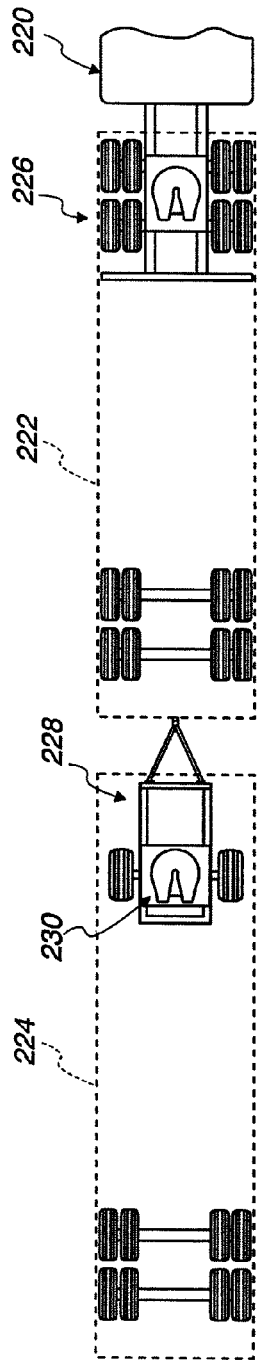
FIG. 15*a* is a bottom view of a tandem trailer arrangement illustrating a semi tractor partially broken away coupled to a lead trailer, which in turn, is coupled to a tandem trailer using a conventional converter dolly during normal forward driving conditions.
Figure 15B:
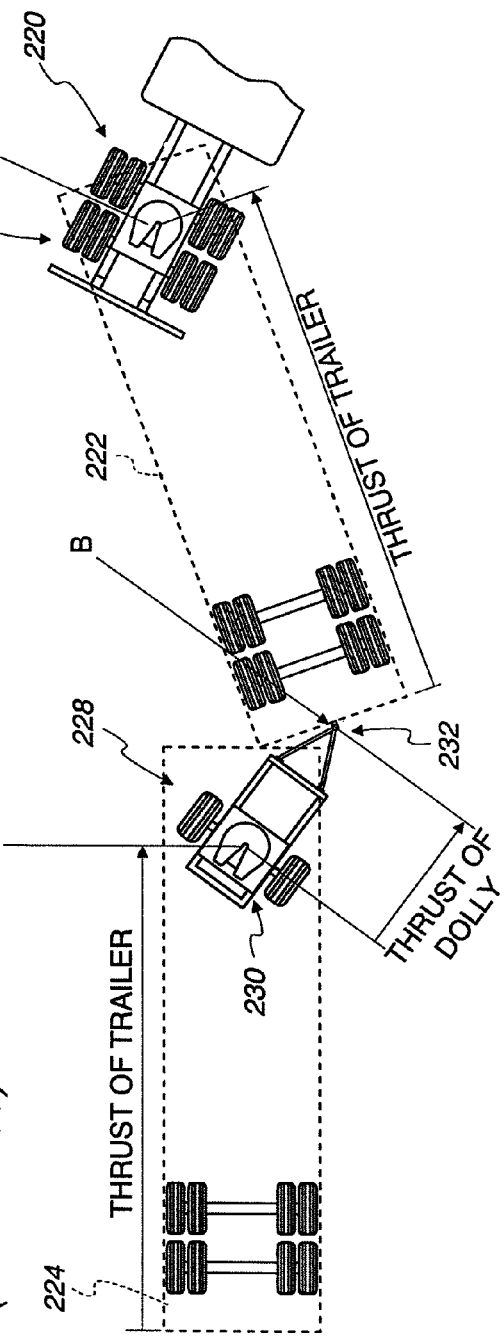
FIG. 15*b* is similar to FIG. 15*a* but illustrating the response of the tandem trailer arrangement in response to an external condition, such as a high wind or sudden stop.

Turning to FIG. 14, converter dolly 302 includes a wheeled cart 36 and a saddle assembly 40, as described in detail below. As also mentioned below, the wheeled cart 36 includes a generally rectangular frame 42. The frame 42 may be used to carry a fifth wheel assembly, generally identified with the reference numeral 320. The fifth wheel assembly 304 is mounted to a base plate 322 that is rigidly carried by the frame 42. The fifth wheel assembly 320 may be removably mounted to the base plate 322 to provide added functionality to the semi trailer dolly 36 described below and illustrated in FIGS. 1-8.

Figure 9:
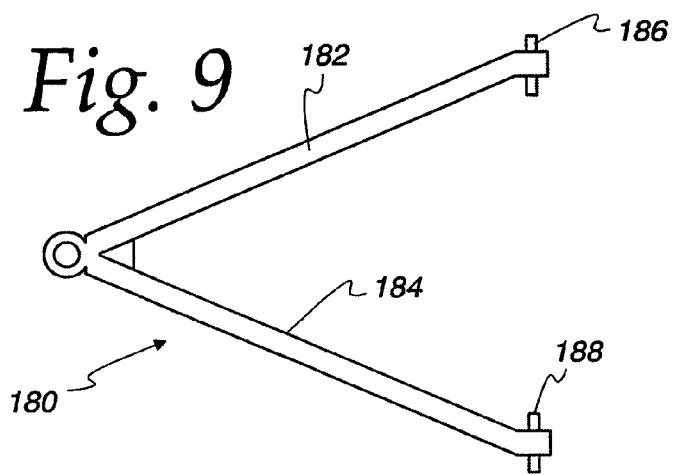
FIG. 9 is a plan view of an exemplary tow bar for use in towing the dolly, illustrated in FIG. 1 into place.
Figure 10:
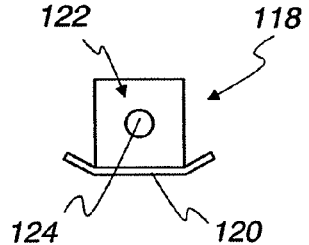
FIG. 10 is an elevational view of a device that allows a saddle portion of the dolly illustrated in FIG. 1 to be slid or dragged under a semi-trailer.

A tow bar 180, for example, as illustrated in FIG. 9, may be coupled to the front of the wheeled cart 36 in a manner as discussed below. The tow bar 180 allows the converter dolly 302 to be coupled to a lead trailer 306 (FIG. 16a) in a manner as discussed above. An extending end of the tow bar 180 includes a hitch mechanism 324.

FIGS. 17-19 illustrate the operation of the converter dolly 302 in accordance with the present invention. FIG. 17 illustrates a retracted mode in which the saddle 40 is uncoupled from the tandem trailer 300. In this mode, the converter dolly 302 is able to rotate with respect to the tandem trailer 300 by way of the fifth wheel assembly 304 (FIGS. 14, 16a and 16b) and a king pin (not shown) extending downwardly from the underside of the tandem trailer 300. In the retracted mode, the self steering axles 44, 46 (FIG. 2) on the wheeled cart 36 may be locked in place so that the converter dolly 302 (FIG. 17) operates in a conventional manner.

Figure 1:
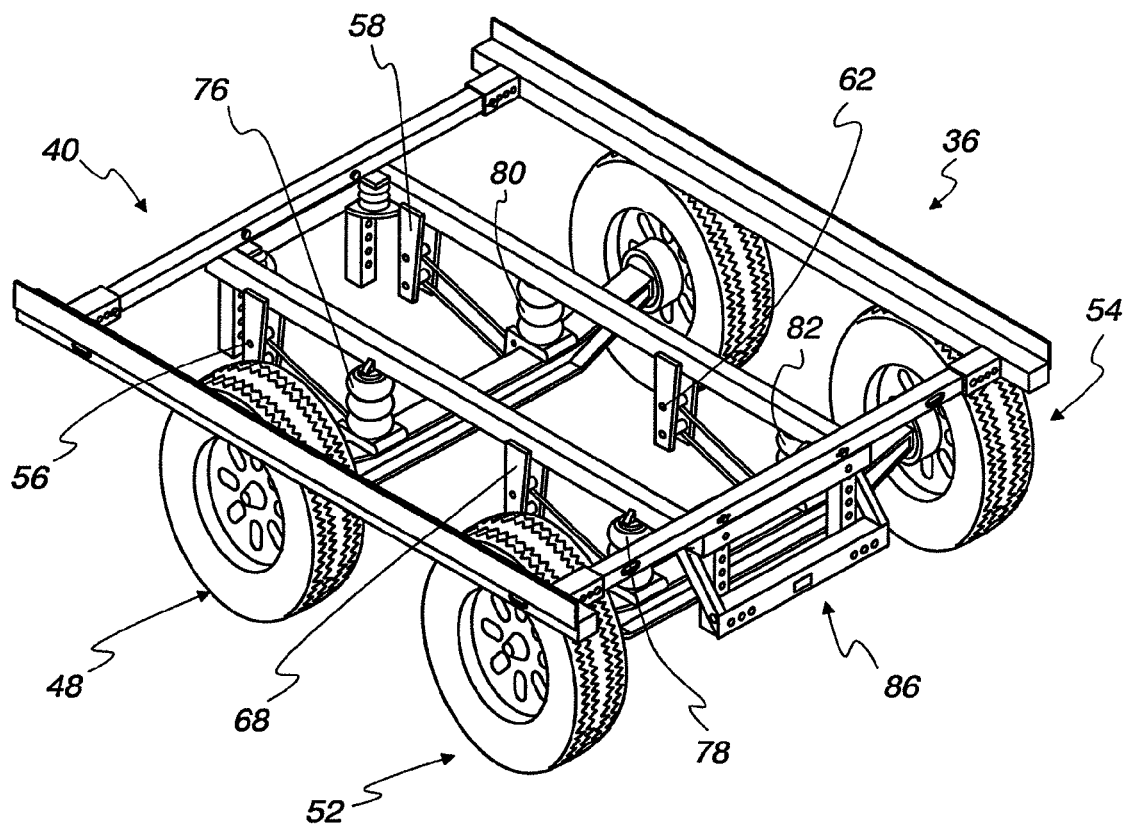
FIG. 1 is a three dimensional view of a semi-trailer dolly for use with the present invention.
Figure 2:
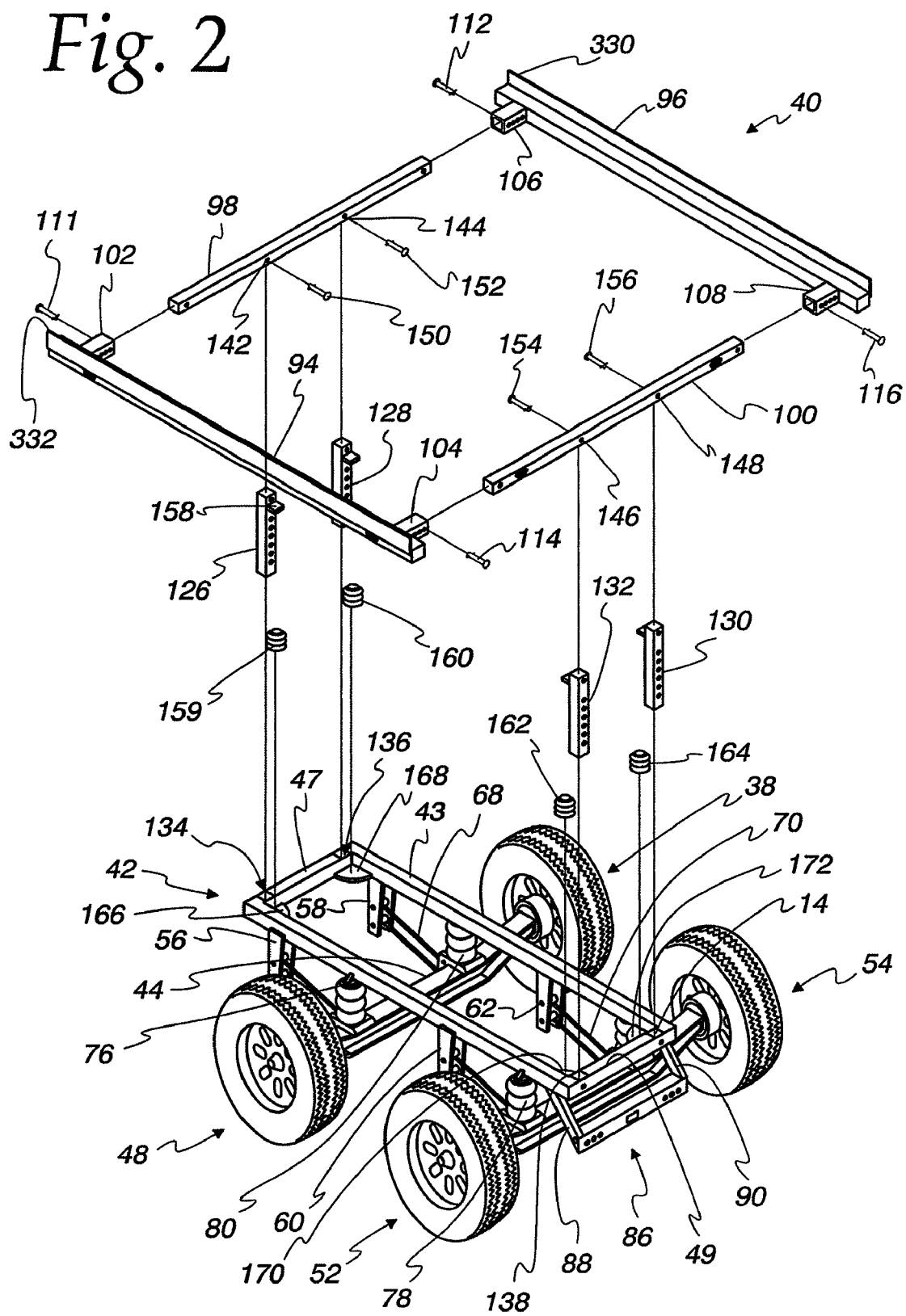
FIG. 2 is an exploded three dimensional view of the dolly illustrated in FIG. 1.

FIGS. 18 and 19 illustrate an extended mode in which the saddle 40 is raised until the underside of the tandem trailer 300 is seated on it. As discussed below, the saddle 40 is adjustable in a direction parallel to axis of the axles 44, 46 (FIG. 2). As such, the saddle 40 can be adjusted to fit conventional tandem trailers 300 of various widths. Also, as best illustrated in FIG. 2, the saddle 40 includes two (2) parallel spaced apart frame members 94 and 96. These frame members 94 and 96 include upwardly extending lip portions 330 and 332 (FIGS. 2 and 17-19). The configuration of the saddle 40 with the extending lip portions 330 and 332 along with the adjustability feature allows the converter dolly 302 to be used with virtually any tandem trailer thus providing far more utility than conventional converter dollies, as discussed above, which can only be used with custom tandem trailers.

When the tandem trailer 300 is seated on the saddle 40, the extending lip portions 330 and 332 enable the tandem trailer 300 to be captured therebetween to prevent movement of the tandem trailer 300 in direction along a transverse axis 334 (FIG. 16*a*) that is generally perpendicular to the longitudinal axis 336 of the tandem trailer 300. By capturing the tandem trailer 300 with respect to the saddle 40, rotation between the tandem trailer 300 and the converter dolly 302 is prevented.

As discussed below in detail, the height of the saddle 40 is adjustable. As discussed below, multiple lifting mechanisms for adjusting the height of the saddle 40 relative to wheeled cart 36 are described and illustrated. In particular, a plurality of air springs 76, 78, 80 and 82 are described and illustrated to lift the frame 42 of the wheeled cart 36 relative to the axles 44, 46. Since the saddle 40 is carried by the frame 42, lifting the frame 42 also lifts the saddle 40. Additional air springs 158, 160, 162 and 164 are described and illustrated for lifting the saddle 40 relative to the frame 42 of the wheeled cart 36. One or both of those lifting mechanisms can be used for the converter dolly 302. Alternative lifting mechanisms are also contemplated.

In a retracted mode, the saddle 40 is uncoupled from the tandem trailer 300. In this mode, the converter dolly 302 is free to rotate relative to the tandem trailer 300 in a conventional manner providing the third pivot point for the tandem trailer arrangement, as discussed above. The retracted mode is useful in urban forward driving conditions where relatively tight turns may be required.

In the retracted mode, the self steering axles 44, 46 (FIG. 2) may be locked in place so that the converter dolly 302 operates in a conventional manner, for example, as disclosed in U.S. Pat. Nos. 5,098,115 and 5,407,221. Alternatively, the self steering axles 44, 46 may be left unlocked and thus self steering. In this configuration, the converter dolly 302 will operate in an alternative conventional manner, as disclosed in U.S. Pat. No. 6,036,217.

In an extended mode, the saddle 40 is raised so as to capture the tandem trailer 300 and prevent rotation therebetween. This mode is contemplated for highway driving in which tight turns are generally not required. As mentioned above, the extended mode eliminates one of the three (3) pivot points in a tandem trailer arrangement and provides greater stability in response to external conditions, such as high winds and sudden stops.

Wheeled Cart and Adjustable Saddle

As mentioned above, the converter dolly in accordance with the present invention incorporates a wheeled cart and a saddle in which the height with respect to the wheeled cart. The wheeled cart and a saddle, hereinafter referred to as a semi-trailer, are also useful in forming a converter dolly with little modification, as described above.

As described in commonly owned co-pending application, the semi-trailer dolly by itself is useful by itself in situations in which semi trailers have a compromised structure due to a load shift or an accident. The semi-trailer dolly can also be used to extricate a semi-trailer stuck under a bridge without damaging the wheels or tires of the semi-trailer. The dolly is configured to provide transverse support of a semi-trailer in an area between the rear axles of the semi-trailer and the front of the semi-trailer. More particularly, the dolly is configured to provide a uniform transverse lifting force to a semi-trailer in an area between the rear axles of a semi-trailer and the front of a semi-trailer where a structural failure of the semi-trailer is likely to occur. The semi-trailer dolly includes a removable saddle and a wheeled cart that includes lifting mechanisms. The removable saddle can be removed from the wheeled cart and positioned under the trailer. Tow truck boom winches connected to opposite sides of the saddle can then be used to lift the saddle and thus the trailer to enable the wheeled cart to be put in position under the saddle. Once the wheeled cart is positioned under the saddle, adjustable lifting mechanisms on the wheeled cart enable the height of the saddle to be varied. The lifting mechanisms are then used to level the floor of the semi-trailer and provide support for the floor of the semi-trailer 24 so that the breached semi-trailer can be transported by a tractor. The wheeled cart may include self steering wheels which facilitate transport of the breached semi-trailer by a tractor.

Referring first to FIGS. 11 and 12, FIG. 11 illustrates a tractor trailer, generally identified with the reference numeral 20, which includes a tractor or truck 22 and a semi-trailer 24. The semi-trailer 24 includes a pair of rear axles and wheels, identified with the reference numerals 26 and 28. Known semi-trailers 24 do not include a front axle and instead rely on the rear axles 30 and 32 of the tractor 22 for rolling support. Such semi-trailers 24 are known to be coupled to the tractor 22 by way of a "fifth wheel" coupling 34.

Because of weight considerations, such semi-trailers are formed with a uni-body construction in which the roof and the walls are designed to help support the load in order to enable a lighter frame structure under the floor. When the roof and/or sidewalls become damaged, for example, due to an unintended load shift, due to an accident, for example or overloading and even when the semi-trailer gets stuck under a low bridge, such damage reduces the ability of the semi-trailer 24 ability to provide nominal support causing failure of the semi-trailer 24. In response to such a condition, the semi-trailer 24 is likely to fail between tits rear axles 26, 28 and the rear axles 30 and 32 of the tractor 22, as generally shown in FIG. 11.

As will be discussed in detail below, the semi-trailer dolly, generally identified with the reference numeral 36, can be positioned under the semi-trailer 24 at a point where a breach in the floor has occurred, i.e at a point 37 where the floor of the semi-trailer 24 buckled, as generally illustrated in FIG. 12. Once the semi-trailer dolly 36 is properly positioned under the semi-trailer 24, the semi-trailer 24 can be moved from the scene of the breach by the tractor 22 to a safe off the road location to transfer the contents of the breached semi-trailer 24 to another trailer or alternatively to a nearby warehouse.

The semi-trailer dolly 36 includes a wheeled cart 38 and a saddle assembly 40. In situations in which the extent of the breach of the semi-trailer 24 results in the buckled portion of the floor of the semi-trailer 24 being lower than the minimum height of the dolly 36, the saddle can be removed from the dolly 36 and slid under the semi-trailer 24 buckled portion of the floor of the semi-trailer 24. Tow trucks with booms and winches can then be positioned on opposite sides of the semi-trailer dolly 36 and used to lift the saddle to a height sufficient to position the wheeled cart beneath the saddle. Air springs located on the wheeled cart are used for providing vertical lift. These air springs are then extended under the influence of a pressurized air supply to raise the height of the saddle to a height to level the floor of the semi-trailer 24, as generally illustrated in FIG. 12 to provide rolling support for the load in the breached semi-trailer 24 to enable transport of the breached semi-trailer 24 by the tractor 22.

As mentioned above and as best shown in FIG. 2, the semi-trailer dolly 36 is a two-piece device and includes a wheeled cart 38 and a removable saddle 40. The wheeled cart 38 includes a generally rectangular frame 42 coupled to at least one or more axles 44 and 46. The rectangular frame 42 includes two generally elongated frame members 43 and 45 and two shorter frame members 47 and 49. The length of the elongated frame members 43 and 45 is selected to be longer than the wheel base of the axles 44 and 46. The length of the shorter frame members is selected to provide stable support for a saddle that can be used to provide transverse support of a standard 102 inch wide semi-trailer.

The rectangular frame 42 is carried by two axles 44 and 46. A plurality of wheel assemblies 48, 50, 52 and 54 are rotatably coupled to the axles 44 and 46. As shown, the wheel assemblies 48, 50, 52 and 54 are connected directly to the axles 44 and 46 and offer no steering capability. Alternately, self steering axles could be provided for the axles 44 and 46, for example, as described in detail in U.S. Pat. Nos. 4,768,802 and 6,820,887, hereby incorporated by reference. In yet other contemplated embodiments, self steering wheel assemblies could be provided for the wheel assemblies 48, 50, 52 and 54, for example as described in detail in U.S. Pat. No. 4,770,430, hereby incorporated by reference. In such an embodiment, the wheel assembly pairs 48, 50 and 52, 54 may be interconnected by way of tie rods (not shown) so that the each pair of wheel assemblies 48, 50 and 52, 54 steer together.

Figure 5:
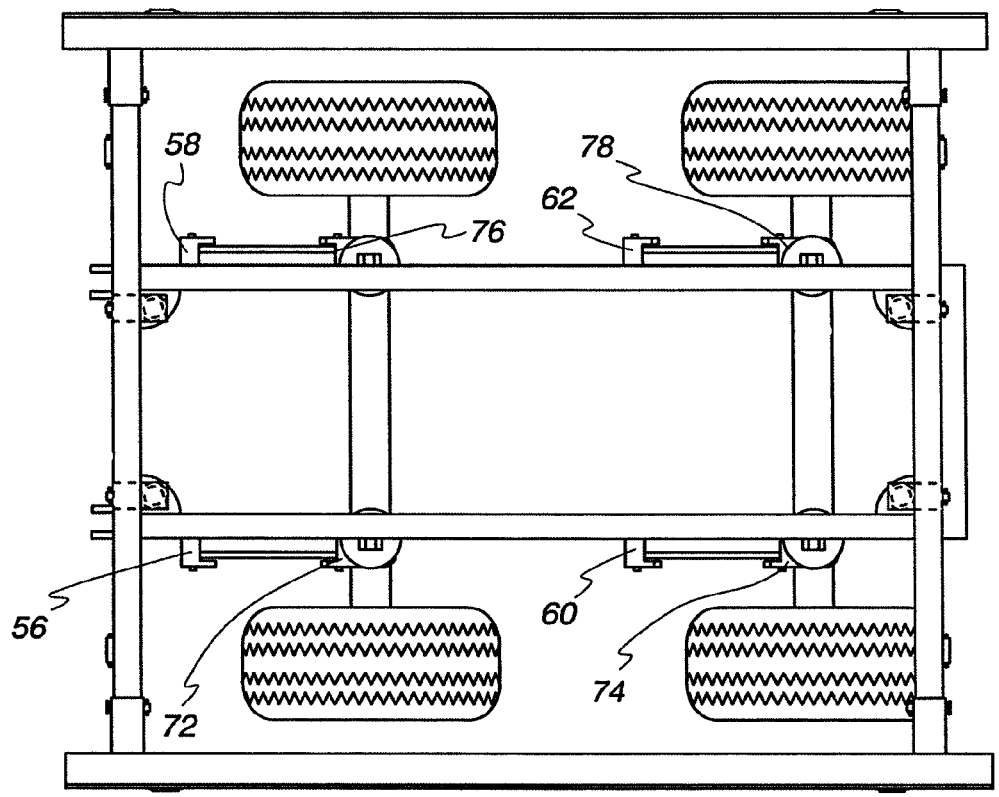
FIG. 5 is a top plan view of the dolly illustrated in FIG. 1.
Figure 7:
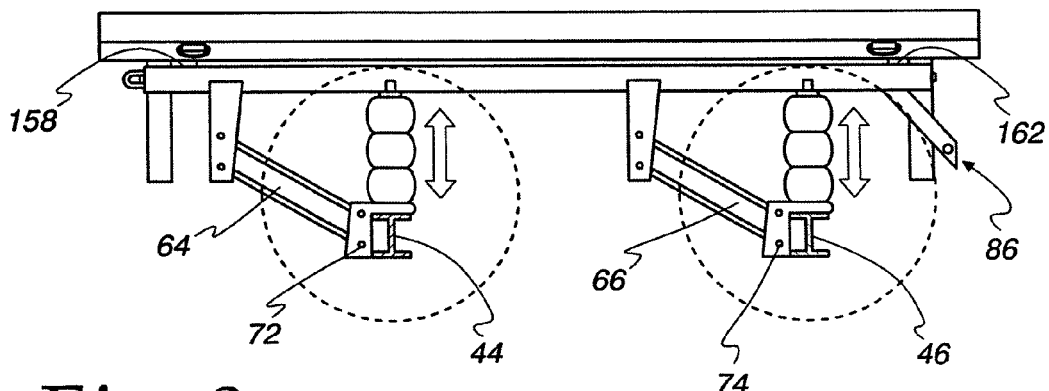
FIG. 7 is a partial side elevational view of the dolly illustrated in FIG. 1, shown with the wheels removed, illustrating a first set of air springs in an expanded position and a second set of air springs in a relaxed position
Figure 8:
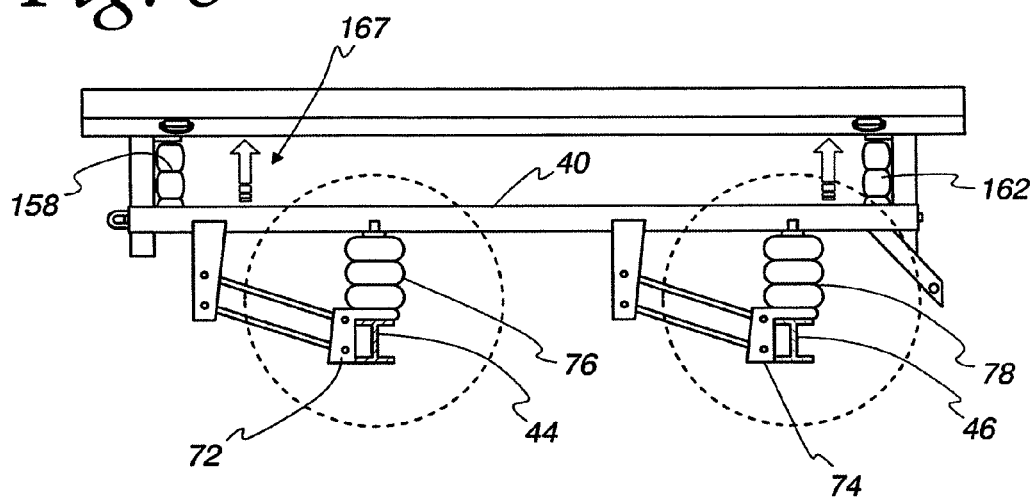
FIG. 8 is a partial side elevational view of the dolly illustrated in FIG. 1, shown with the wheels removed, illustrating a first set of air springs in a relaxed position and a second set of air springs in an expanded position.

Referring to FIGS. 7 and 8, the axles 44 and 46 are attached to the rectangular frame 42 by way of a plurality of vertical arms 56, 58, 60 and 62 (FIG. 2); a plurality of swing arms 64, 66 (FIGS. 7 and 8), 68 and 70 (FIG. 2) and a plurality of brackets 72, 74, 76 and 78 (FIG. 5). As best shown in FIGS. 7 and 8, the swing arms 64, 66, 68 and 70 are pivotally mounted to the vertical arms 64, 66, 68 and 70. Lifting mechanisms, such as air springs 76, 78, 80 and 82 (FIG. 2), are securely disposed between the brackets 72, 74, 76 and 78 (FIG. 5) and the elongated frame members 43 and 45 (FIG. 2).

FIG. 8 illustrates a relaxed position for the air springs 76, 78, 80 and 82, i.e a condition in which the air springs 76, 78, 80 and 82 (FIG. 2) are subject to minimal air pressure. FIG. 7 illustrates an extended position for the air springs 76, 78, 80 and 82, i.e a condition in which the air springs 76, 78, 80 and 82 (FIG. 2) have been pressurized by a source of external air pressure (not shown). These air springs 76, 78, 80 and 82 (FIG. 2) allow the height of the generally rectangular frame 42 (FIG. 2) to be varied with respect to the axles 44 and 46 (FIGS. 7 and 8). More particularly, in a relaxed position as shown in FIG. 8, the distance between the axles 44 and 46 and the generally rectangular frame 42 (FIG. 2) is minimal. As shown in FIG. 7, when the air springs 76, 78, 80 and 82 are fully extended, as indicated by the arrow 84, the distance between the axles 44 and 46 and the generally rectangular frame 42 (FIG. 2) is increased. As such the air springs 76, 78, 80 and 82 serve as one lifting mechanism and in some embodiments of the semi trailer dolly may be the only lifting mechanism.

Figure 4:
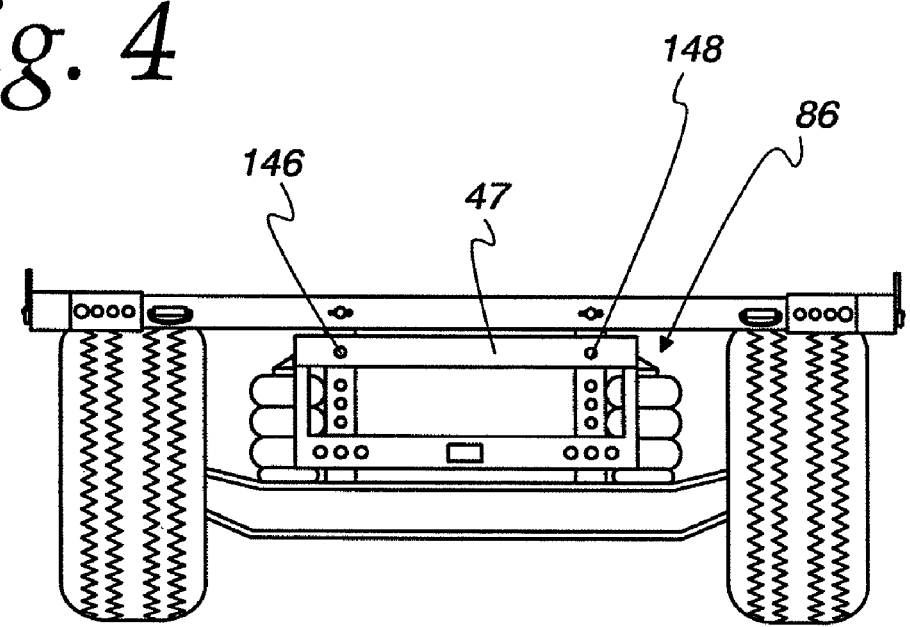
FIG. 4 is a front elevational view of the dolly illustrated in FIG. 1.

The wheeled cart 38 may also include a bumper 86 (FIGS. 2 and 4). The bumper is attached to one of the shorter frame members 47, 49 of the generally rectangular frame 42. As shown in FIG. 2; the bumper 86 is fixedly attached to the frame member 49 by way of a pair of spaced apart brackets 88 and 90. The bumper 86 may be used carry tail lights, generally indicated with the reference numeral 92, which can be used in the event the semi-trailer's tail lights and/or electrical system are damaged or are not operational. The bumper 86 can also be used to carry one or more electrical connectors that can be connected on one end to temporary lights (not shown) on the back of the semi-trailer 24.

As mentioned above, the semi-trailer dolly 36 includes a removable saddle 40 (FIG. 2). The saddle 40 is formed as a generally rectangular or square frame which includes a plurality of frame members 94, 96, 98 and 100. The saddle frame may be formed to be adjustable in a transverse direction, i.e. a direction parallel to the axles 44 and 46, as well as a vertical direction, i.e. perpendicular to the axles 44 and 46, with respect to the wheeled cart 38. Alternately, the saddle frame 40 may include the capability for no adjustment or adjustment in one or the other of the transverse direction or vertical direction.

Figure 3:
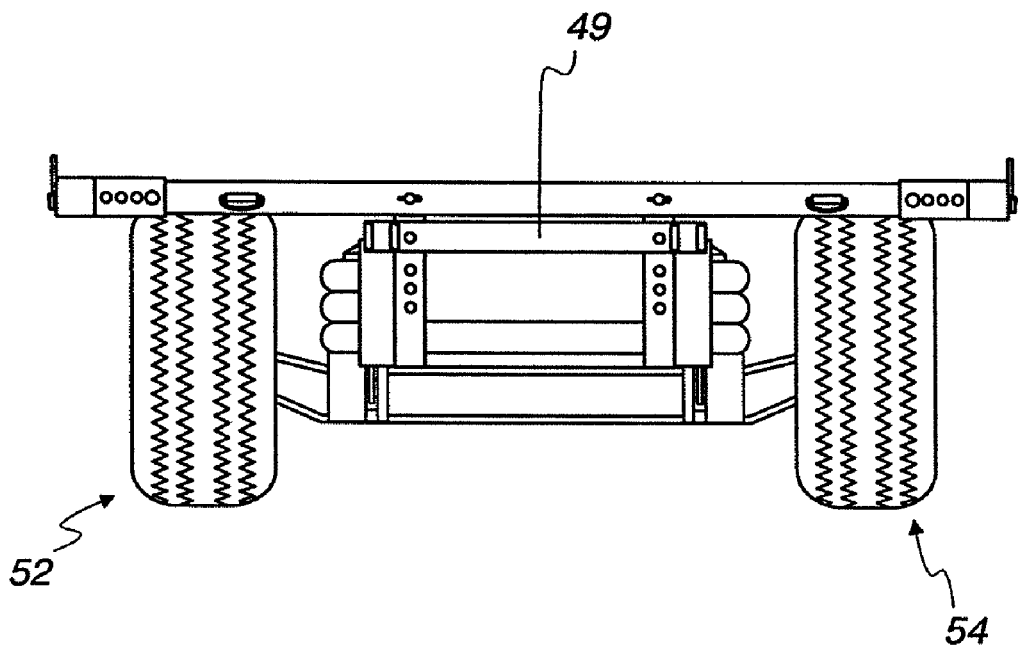
FIG. 3 is a rear elevational view of the dolly illustrated in FIG. 1.

In embodiments which incorporate adjustments of the width of the saddle frame 40, two of the oppositely disposed and spaced apart frame members 94 and 96 (FIG. 2) are provided with adjustment bars 102, 104, 106 and 108, which, in conjunction with the frame members 98 and 100, enable the width of the saddle 40 to be adjusted, as illustrated in FIGS. 3 and 4. More particularly, FIG. 3 illustrates a condition in which the width of the saddle 40 is expanded, for example, with respect to the wheel assemblies 52 and 54 while FIG. 4 illustrates a condition in which the width of the saddle 40 is compressed with respect to the wheel assemblies 52 and 54, as indicated by the arrows 104 and 106.

These adjustment bars 102, 104, 106 and 108 (FIG. 2) may be secured adjacent opposing ends of the spaced apart frame members 94 and 96 so as to be generally parallel to the axles 44 and 46, as best shown in FIG. 2. As shown, each of the adjustment bars 102, 104, 106 and 108 includes a plurality of apertures, generally identified with the reference numeral 110. As mentioned above, the adjustment bars 102, 104, 106 and 108 cooperate with the saddle frame members 98 and 100 to provide adjustment of the width of the saddle 40, as discussed above. More particularly, the adjustment bars 102, 104, 106 and 108 may be formed with a hollow cross-section to enable mating with the frame members 98 and 100. As shown, the adjustment bars 102, 104, 106 and 108 are formed with a generally rectangular cross-section slightly larger than the cross-section of the saddle frame members 98 and 100 to allow the ends of the saddle frame members 98 and 100 to be received, as best shown in FIG. 5. Fasteners or pins 111, 112, 114 and 116 may be used to securely couple the saddle members 98 and 100 to the adjustment bars 102, 104, 106 and 108 to form a saddle at the desired width.

In situations where the extent of the breach of the semi-trailer 24 is such that the saddle 40 must be removed and placed under the floor of the semi-trailer 24, the saddle 40 may be slid into place. In order to prevent wear and damage to the saddle 40 and to facilitate positioning of the saddle 40 under the semi-trailer 24, "shoes" 118 (FIG. 10), may be removably connected to the saddle 40. In particular, each shoe 118 includes slide surface 120 and a vertical bracket 122. The vertical bracket 122 includes an aperture 124. The shoe 118 can be removably connected to the saddle 40. More particularly, the shoe 118 can be connected to the adjustment bars 102, 104, 106 and 108 (FIG. 2) by way of the pins 102, 104, 106 and 108 or additional pins (not shown).

As mentioned above, the saddle 40 is carried by the wheeled cart 38. In embodiments in which the initial height of the saddle 40 is adjustable with respect to the rectangular frame 42 of the wheeled cart 38, vertical adjustment bars 126, 128, 130 and 132 are provided. These adjustment bars 126, 128, 130 and 132 are received in apertures 134, 136, 138 and 140 formed in the shorter frame members 47 and 49 of the rectangular frame 42, forming a portion of the wheeled cart 38. The configuration allows the vertical adjustment bars 126, 128, 130 and 132 to be coupled to the frame members 98 and 100 of the saddle 40 at a desired height and secured thereto by way of pins 150, 152, 154 and 156 (FIG. 2) and corresponding apertures 142, 144, 146 and 148. In the embodiment shown, the adjustment bars 126, 128, 130 and 132 are free to move up and down in the apertures 134, 136, 138 and 140 formed in the shorter frame members 47 and 49 of the rectangular frame 42, forming a portion of the wheeled cart 38. Each of the vertical adjustment bars 126, 128, 130 and 132 may include a stop, generally identified with the reference numeral 158. The stops 158 may be used to limit downward movement of the vertical adjustment bars 126, 128, 130 and 132 within the apertures 134, 136, 138 and 140, formed in the shorter frame members 47 and 49 of the wheeled cart 38.

An additional lifting mechanism may be provided to raise the height of the saddle 40 relative to the wheeled cart 38. More particularly, additional air springs 158, 160, 162 and 164 may be provided to adjust the height of the saddle 40 with respect to the frame 42 of the wheeled cart 38 as generally shown in FIGS. 7 and 8. In particular, FIG. 7 illustrates a condition in which the air springs 158, 160, 162 and 164 are in a relaxed position while FIG. 8 indicates a condition in which the air springs 158, 160, 162 and 164 are in an extended position due to the influence of air pressure, as indicated by the arrows 167.

With reference to FIG. 2, the air springs 158, 160, 162 and 164 are securely carried by gusset plates 166, 168, 170 and 172, secured in the corners of the generally rectangular frame 42, forming a portion of the wheeled cart 38. In this embodiment, the air springs 158, 160, 162 and 164 are configured to exert an upward force on the stops 158, discussed above, under the influence of air pressure, as best shown in FIG. 8.

Figure 6:
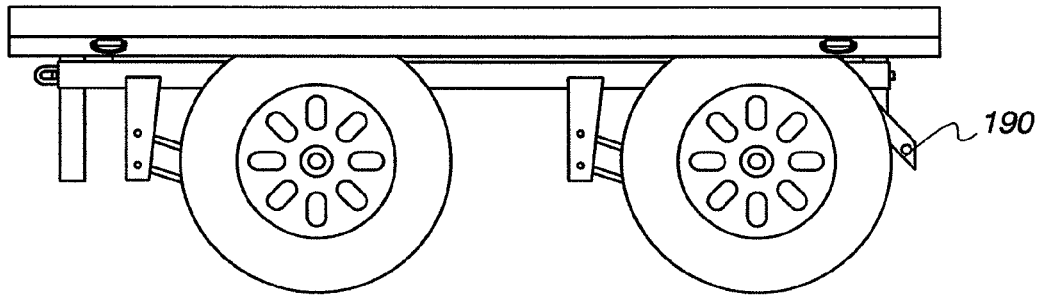
FIG. 6 is a side elevational view of the dolly illustrated in FIG. 1.

FIG. 9 illustrates an exemplary tow bar 180 that can be used to tow the dolly 36 or just the wheeled cart 38 into place underneath a semi-trailer 24. The tow bar 180 is formed as a wishbone with two dependent legs 182 and 184, joined at one end. The free ends of the of the tow bar 180 may be provided with apertures (not shown) and pins 186 and 188 that enable the tow bar 180 to be coupled to the bumper 86. In particular, the brackets 88 and 90, used to connect the bumper 86 to the rectangular frame 42 may be provided with apertures 190, as best shown in FIG. 6 to enable the tow bar 180 to be coupled to the dolly 36.

Obviously, many modifications and variations of the present invention are possible in light of the above teachings. Thus, it is to be understood that, within the scope of the appended claims, the invention may be practiced otherwise than as specifically described above.

What is claimed and desired to be covered by a Letters Patent is as follows.

I claim:

1. A converter dolly for a tandem trailer having a lead trailer and a rear trailer, the rear trailer having spaced apart sidewalls, the converter dolly comprising:

a wheeled cart which includes a frame and at least one self-steering axle for rotatably carrying at least two wheel assemblies;

a saddle carried by the frame of said wheeled cart, said saddle formed with spaced apart lip portions formed to capture said side walls of the rear trailer therebetween to prevent rotation of the rear trailer with respect to said wheeled cart;

a lifting mechanism for selectively varying the height of the saddle relative to the frame and defining a retracted position in which said saddle is uncoupled from said rear trailer and an extended position in which said rear trailer is captured by said saddle;

a plurality of adjustment bars for rigidly securing said saddle to said frame at a selected height;

a fifth wheel assembly carried by said frame for coupling to said rear trailer; and a tow bar and hitching mechanism for coupling said converter dolly to said lead trailer, wherein said saddle captures said rear trailer when said lifting mechanism is in an extended position and prevents said rear trailer from rotating relative to said wheeled cart.

2. The converter dolly as recited in claim 1, wherein said at least one self-steering axle has a self-steering mode and a locked mode in which the self-steering axle can be locked in place.

3. The converter dolly as recited in claim 1, wherein said fifth wheel assembly is removably mounted to said frame.

4. The converter dolly as recited in claim 1, wherein said saddle is also adjustable in a direction parallel to said self-steering axle when said self-steering axle is locked in place to enable the saddle to be used with trailers of various widths.

5. The converter dolly as recited in claim 1, wherein said lifting mechanism includes at least one air spring mounted between saddle and said frame.

6. The converter dolly as recited in claim 1, further including a second lifting mechanism for lifting said frame with respect to said at least one self-steering axle.

7. The dolly as recited in claim 1, wherein said lifting mechanism includes at least one air spring mounted between said at least one self-steering axle and said frame.

8. A multi-functional dolly for use with tandem trailers having a lead trailer and a rear trailer, the rear trailer having spaced apart sidewalls, the dolly comprising:

a wheeled cart having a saddle with extending lips for capturing the sidewalls of the rear trailer, said saddle adjustable in a vertical direction that allows said rear trailer to be seated in the saddle and prevent rotation of the wheeled cart with respect to the rear trailer in an extended position and a retracted position that allows the rear trailer to rotate with respect to the wheeled cart, wherein said wheeled cart has at least one self-steering axle for rotatably carrying at least two wheel assemblies;

a fifth wheel assembly, carried by said wheeled cart for coupling said rear trailer to said wheeled cart; and a tow bar and hitching mechanism for coupling said wheeled cart to said lead trailer.

9. The multi-functional dolly as recited in claim 8, wherein said saddle is also adjustable in a direction parallel to the width of the rear trailer to enable the saddle to be adjusted to fit rear trailers having different widths.

10. The multi-functional dolly as recited in claim 8, wherein said at least one self-steering axle has a self-steering mode and a locked mode in which the self-steering axle is locked in place, wherein said locked mode and said self-steering mode being user-selectable.

* * * * *